United States Patent
Hara et al.

(10) Patent No.: US 9,362,554 B2
(45) Date of Patent: *Jun. 7, 2016

(54) METHOD OF MANUFACTURING A POSITIVE ELECTRODE WITH A CONDENSATION REACTION INITIATED BY HEATING AND REDUCED PRESSURE

(75) Inventors: Tomitaro Hara, Okazaki (JP); Akira Tsujiko, Aichi-ken (JP); Yohei Shindo, Nisshin (JP); Sachie Yuasa, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 513 days.

This patent is subject to a terminal disclaimer.

(21) Appl. No.: 13/499,307

(22) PCT Filed: Oct. 2, 2009

(86) PCT No.: PCT/JP2009/067271
§ 371 (c)(1),
(2), (4) Date: Mar. 30, 2012

(87) PCT Pub. No.: WO2011/039890
PCT Pub. Date: Apr. 7, 2011

(65) Prior Publication Data
US 2012/0189914 A1    Jul. 26, 2012

(51) Int. Cl.
*H01M 4/36* (2006.01)
*H01M 4/136* (2010.01)
(Continued)

(52) U.S. Cl.
CPC ............. *H01M 4/36* (2013.01); *H01M 4/136* (2013.01); *H01M 4/1397* (2013.01);
(Continued)

(58) Field of Classification Search
CPC ..... H01M 4/623; H01M 4/625; H01M 4/366; H01M 2004/028; H01M 4/36; H01M 4/136; H01M 4/1397; H01M 4/5825; H01M 4/621; H01M 4/02; Y02E 60/122; Y02P 70/54
See application file for complete search history.

(56) References Cited

U.S. PATENT DOCUMENTS

2003/0129496 A1    7/2003    Kasai et al.
2004/0131934 A1 *  7/2004    Sugnaux ............... B82Y 20/00
                                                        429/209

(Continued)

FOREIGN PATENT DOCUMENTS

CN    1714465    12/2005
CN    1838454     9/2006

(Continued)

OTHER PUBLICATIONS

English Translation of JP 2009-43703 A.*

(Continued)

*Primary Examiner* — Milton I Cano
*Assistant Examiner* — Philip A Stuckey
(74) *Attorney, Agent, or Firm* — Finnegan, Henderson, Farabow, Garrett & Dunner, LLP

(57) ABSTRACT

A positive electrode for a lithium secondary battery provided by the present invention includes a positive electrode active material layer having a particulate positive electrode active material constituted by a composite oxide containing lithium and at least one type of transition metal element, and at least one type of binding material constituted by a polymer compound having at least one functional group, and a conductive carbonaceous coating film is formed on a surface of the positive electrode active material. Further, the polymer compound constituting the binding material is molecularly bound to carbon atoms constituting the carbonaceous coating film of at least a part of the positive electrode active material, whereby a composite compound is formed from the polymer compound molecularly bound to the carbon atoms and a carbon network constituting the carbonaceous coating film containing the carbon atoms.

4 Claims, 4 Drawing Sheets

(51) Int. Cl.
*H01M 4/1397* (2010.01)
*H01M 4/58* (2010.01)
*H01M 4/62* (2006.01)
*H01M 4/02* (2006.01)

(52) U.S. Cl.
CPC .......... *H01M 4/366* (2013.01); *H01M 4/5825* (2013.01); *H01M 4/621* (2013.01); *H01M 4/623* (2013.01); *H01M 4/02* (2013.01); *H01M 2004/028* (2013.01); *Y02E 60/122* (2013.01); *Y02P 70/54* (2015.11)

(56) References Cited

U.S. PATENT DOCUMENTS

| | | | |
|---|---|---|---|
| 2004/0229123 | A1 | 11/2004 | Takahashi et al. |
| 2005/0130025 | A1 | 6/2005 | Kadowaki et al. |
| 2006/0035150 | A1 | 2/2006 | Audemer et al. |
| 2006/0263697 | A1 | 11/2006 | Dahn et al. |
| 2008/0233477 | A1* | 9/2008 | Takahashi et al. ............ 429/212 |
| 2009/0136845 | A1* | 5/2009 | Choi .................. H01M 4/0404 429/212 |
| 2009/0142668 | A1 | 6/2009 | Ishii |
| 2010/0075229 | A1 | 3/2010 | Atsuki et al. |
| 2012/0183851 | A1 | 7/2012 | Hara et al. |

FOREIGN PATENT DOCUMENTS

| | | |
|---|---|---|
| CN | 101064367 | 10/2007 |
| EP | 1 850 409 | 10/2007 |
| JP | 11-195419 | 7/1999 |
| JP | 2001234277 | 9/2001 |
| JP | 2002-231222 | 8/2002 |
| JP | 2003203632 | 7/2003 |
| JP | 2003-292308 | 10/2003 |
| JP | 2003-292309 | 10/2003 |
| JP | 2004311408 | 11/2004 |
| JP | 2005-530676 | 10/2005 |
| JP | 2006004631 | 1/2006 |
| JP | 2006-216371 | 8/2006 |
| JP | 2007035358 | 2/2007 |
| JP | 2008117749 | 5/2007 |
| JP | 2008-251497 | 10/2008 |
| JP | 2008-270204 | 11/2008 |
| JP | 2008-541405 | 11/2008 |
| JP | 2009-43703 | 2/2009 |
| JP | 2009043703 A * | 2/2009 |
| JP | 2009-129889 | 6/2009 |
| JP | 2009146773 | 7/2009 |
| JP | 2009152188 | 7/2009 |
| JP | 5370790 | 9/2013 |
| KR | 20050094346 | 9/2005 |
| WO | WO 2011/036797 A1 | 3/2011 |

OTHER PUBLICATIONS

International Search Report in International Application No. PCT/JP2009/067271; Mailing Date: Nov. 10, 2009.
Kim, et al., "Crystalline Properties of PVdF/NMP Solution-Cast Films by Different Evaporation Temperatures," Theories and Applications of Chem. Eng., 2002. vol. 8, No. 2, pp. 5482-5485.
Restriction Requirement issued in U.S. Appl. No. 13/499,323, mailed Nov. 18, 2014.
Office Action for U.S. Appl. No. 13/499,323 dated May 5, 2015.
Final Office Action for U.S. Appl. No. 13/499,323 dated Nov. 12, 2015.

* cited by examiner

METHOD OF MANUFACTURING A POSITIVE ELECTRODE WITH A CONDENSATION REACTION INITIATED BY HEATING AND REDUCED PRESSURE

CROSS-REFERENCE TO RELATED APPLICATIONS

This application is a national phase application of International Application No. PCT/JP2009/067271, filed Oct. 2, 2009, the contents of which are incorporated herein by reference.

TECHNICAL FIELD

The present invention relates to a lithium secondary battery and a use thereof, and more particularly to a positive electrode used in the lithium secondary battery. Even more particularly, the present invention relates to a positive electrode material constituting a positive electrode active material layer provided in a positive electrode for a lithium secondary battery, and to a manufacturing method thereof.

BACKGROUND ART

In recent years, lithium secondary batteries (typically lithium ion batteries), nickel hydrogen batteries, and other secondary batteries have increased in importance as in-vehicle power supplies and power supplies for personal computers and portable terminals. A lithium secondary battery in particular is lightweight and exhibits high energy density, and may therefore be used favorably as a high output power supply for installation in a vehicle.

A first requirement of a lithium secondary battery used as a motor driving power supply for a vehicle such as an EV (Electric Vehicle), an HV (Hybrid Vehicle), or a PHV (Plug-in Hybrid Vehicle) is favorable charging/discharging at a high rate (at least 10 C, for example). In response to this first requirement, a particle size of a compound used as a positive electrode active material may be reduced. Recently, micro-particulate positive electrode active materials having primary particles with a mean particle diameter of less than 1 µm have come into use. This type of micro-particulate positive electrode active material has a comparatively large specific surface area and is therefore suitable for high rate charging/discharging. Further, use of a positive electrode active material in which a surface of the active material particles is covered with a conductive material (carbon black or the like) has been proposed (see Patent Document 1 below, for example) with the aim of improving a conductivity of the positive electrode active material.

A second requirement of a lithium secondary battery used as a motor driving power supply is high durability. More specifically, a vehicle battery is used over a long period of time while being charged and discharged at a high rate (a high output) in a harsh environment subject to dramatic temperature variation (from a low temperature region below −20° C. to a high temperature region exceeding 60° C., for example), and therefore the battery must be sufficiently durable to ensure that an internal resistance of the battery does not increase even under such usage conditions. In response to this second requirement, the positive electrode active material particles may be held by great adhesive force in a predetermined position of a positive electrode collector (in other words, on a positive electrode active material layer). It is effective for this purpose to increase a content (a content ratio) of a binding material (a binder) included in the positive electrode active material layer.

When the content (ratio) of the binding material is increased, however, the content (ratio) of the positive electrode active material decreases correspondingly, leading to a reduction in a capacity of the battery, which is undesirable.

With regard to this point, Patent Document 1, for example, discloses a positive electrode that prevents a positive electrode active material from falling off a positive electrode collector by forming a positive electrode mixture (a positive electrode active material layer) from a binding material and a mixed positive electrode active material constituted by a positive electrode active material whose surface is partially covered by a conductive material and a positive electrode active material not covered by the conductive material. Patent Document 1 states that when the mixed positive electrode active material constituted by the positive electrode active material whose surface is partially covered by the conductive material and the positive electrode active material not covered by the conductive material is used in this manner, a degree by which the active materials are directly bound to each other by the binding material increases, and therefore the active material (particles) can be prevented from falling off the active material layer formed on the positive electrode collector.

Patent Document 2 discloses a technique for improving adhesion between a negative electrode active material and a negative electrode collector. However, the technique described in Patent Document 2 cannot be applied favorably to the positive electrode side.

PRIOR ART DOCUMENTS

Patent Literature

Patent Document 1: Japanese Patent Application Laid-open No. 2002-231222
Patent Document 2: Japanese Patent Application Laid-open No. 2006-216371

SUMMARY OF THE INVENTION

Problem(s) to be Solved by the Invention

The present invention has been designed to solve these conventional problems relating to a lithium secondary battery for a vehicle, and an object of the present invention is to provide a positive electrode for a lithium secondary battery in which an improvement in durability is realized without excessively increasing a content (a content ratio) of a binding material. Another object of the present invention is to provide a positive electrode active material and other materials for forming this positive electrode. A further object of the present invention is to provide a method of manufacturing this positive electrode.

Hence, the present invention provides a lithium secondary battery including the positive electrode disclosed herein, and a manufacturing method thereof. The present invention also provides a vehicle (typically an automobile) that includes the lithium secondary battery having the positive electrode disclosed herein as a motor driving power supply.

The present invention provides a positive electrode for a lithium secondary battery having the following constitution. A positive electrode disclosed herein is a positive electrode for a lithium secondary battery having a positive electrode collector and a positive electrode active material layer formed on the collector. In one positive electrode disclosed herein, the positive electrode active material layer includes a particulate positive electrode active material constituted by a composite oxide containing lithium and at least one type of transition metal element, and at least one type of binding material constituted by a polymer compound having at least one functional group. Further, in one positive electrode disclosed herein, a conductive carbonaceous coating film is formed on a surface of the positive electrode active material, and the polymer compound constituting the binding material is molecularly bound to carbon atoms constituting the carbonaceous coating film of at least a part of the positive electrode active material, whereby a composite compound comprises the polymer compound molecularly bound to the carbon atoms and a carbon network constituting the carbonaceous coating film containing the carbon atoms.

With respect to the present invention, "molecularly bound" means that the polymer compound constituting the binding material is bound (coupled) to the carbon atoms constituting the carbonaceous coating film such that the bound (coupled) polymer compound part and the carbon network constituted by the carbonaceous coating film containing the carbon atoms form a single molecular chain (in other words, a composite compound constituted by a carbon network part and a binding material forming part). Therefore, here, "molecularly bound" does not include a form of binding in which two mutually bound molecules (a compound) exist independently, for example a physical adsorption phenomenon (a Van der Waals phenomenon, for example).

In the positive electrode for a lithium secondary battery thus constituted, the conductive carbonaceous coating film is formed on the surface of the positive electrode active material included in the positive electrode active material layer, and the binding material is molecularly bound (bound by a condensation reaction via the aforementioned functional group, for example) to the carbonaceous coating film in at least a part of the positive electrode active material. Therefore, the positive electrode active material particles existing in the positive electrode active material layer can be held with great adhesive strength even when the content (content ratio) of the binding material is comparatively small.

Hence, by using the positive electrode according to the present invention, it is possible to provide a highly marketable lithium secondary battery (typically a lithium ion battery) with which an improvement in durability can be realized without excessively increasing the content (content ratio) of the binding material and increases in internal resistance can be suppressed.

In a preferred aspect of the positive electrode for a lithium secondary battery disclosed herein, the positive electrode active material layer includes at least one type of polymer compound containing a hydroxy group and/or a carboxyl group as the binding material. By containing a polymer compound having a functional group as the binding material, the polymer compound constituting the binding material can be coupled favorably to the carbonaceous coating film on the surface of the positive electrode active material particles through chemical binding (in other words, the aforementioned molecular binding) via the functional group. A vinylidene fluoride-based polymer having vinylidene fluoride as a main monomer component and a hydroxy group and/or a carboxyl group introduced therein may be cited as a favorable example of the polymer compound. Therefore, the positive electrode according to a preferred aspect includes the aforesaid vinylidene fluoride polymer as the binding material.

In another preferred aspect of the positive electrode for a lithium secondary battery disclosed herein, the polymer compound is cross-linked such that a binding material network is formed in the positive electrode active material layer.

By cross-linking the binding material in the positive electrode active material layer such that a network (in other words, a network configuration in which the molecules constituting the binding material are cross-linked to each other) is formed, the adhesive strength of the positive electrode active material particles existing in the positive electrode active material layer can be improved further.

In another preferred aspect of the positive electrode for a lithium secondary battery disclosed herein, the positive electrode active material is constituted by the aforesaid composite oxide, which takes a particulate form having primary particles with a mean particle diameter based on measurement using an electron microscope (more specifically, a transmission electron microscopy (TEM) or a scanning electron microscope (SEM)) of 1 μm or less.

When this type of positive electrode active material constituted by a micro-particulate composite oxide is used, a specific surface area of the positive electrode active material increases. Hence, by using the positive electrode according to this aspect, a lithium secondary battery that exhibits superior conductivity and is therefore suitable for high rate charging/discharging can be provided.

In another preferred aspect of the positive electrode for a lithium secondary battery disclosed herein, the composite oxide constituting the particulate positive electrode active material is a compound represented by a general formula:

$$LiMAO_4 \quad (1).$$

The M in this formula denotes one or more types of elements (typically one or more types of metallic elements) including at least one type of metallic element selected from the group consisting of Fe, Co, Ni, and Mn. In other words, the compound contains at least one type of metallic element selected from the group consisting of Fe, Co, Ni, and Mn, but the existence of small amounts of other minor additional elements is permitted (on the other hand, these minor additional elements do not have to exist). Further, the A in this formula denotes one or more types of elements selected from the group consisting of P, Si, S, and V.

By employing this type of polyanionic particulate compound as the positive electrode active material, a lithium secondary battery that exhibits an even more superior high rate charging/discharging performance can be provided.

In Formula (1), A is particularly preferably P and/or Si.

Further, to achieve the objects described above, the present invention provides a method of manufacturing a positive electrode for a lithium secondary battery having a positive electrode collector and a positive electrode active material layer formed on the collector.

The positive electrode manufacturing method disclosed herein includes:

preparing a positive electrode active material layer forming composition including a positive electrode active material that is constituted by a composite oxide containing lithium and at least one type of transition metal element and contains a conductive carbonaceous coating film on a surface thereof, and at least one type of binding material constituted by a polymer compound having at least one functional group, and a solvent capable of dissolving or dispersing the binding material;

forming the positive electrode active material layer on the positive electrode collector by providing the composition on a surface of the positive electrode collector; and initiating a condensation reaction between the binding material contained in the positive electrode active material layer and the carbonaceous coating film on the positive electrode active material such that the polymer compound constituting the binding material is molecularly bound to carbon atoms constituting the carbonaceous coating film of at least a part of the positive electrode active material.

With this manufacturing method, it is possible to manufacture the positive electrode for a lithium secondary battery according to the present invention, described above.

A polymer compound containing a hydroxy group and/or a carboxyl group is preferably used as the binding material. Further, at least one type of the used polymer compound is particularly preferably a vinylidene fluoride-based polymer having vinylidene fluoride as a main monomer component and a hydroxy group and/or a carboxyl group introduced therein.

A preferred aspect of the positive electrode manufacturing method disclosed herein further includes cross-linking the polymer compound constituting the binding material contained in the positive electrode active material layer. By cross-linking the polymer compound constituting the binding material in this manner, a binding material network can be formed in the positive electrode active material layer.

Further, a positive electrode active material constituted by the aforesaid composite oxide, which takes a particulate form having primary particles with a mean particle diameter based on measurement using an electron microscopy (a TEM or a SEM) of 1 μm or less, is preferably used as the positive electrode active material.

A compound represented by a general formula:

$$LiMAO_4 \quad (1)$$

may be cited as a preferred example of the composite oxide constituting the positive electrode active material. The M in this formula denotes one or more types of elements (typically one or more types of metallic elements) including at least one type of metallic element selected from the group consisting of Fe, Co, Ni, and Mn. In other words, the compound contains at least one type of metallic element selected from the group consisting of Fe, Co, Ni, and Mn, but the existence of small amounts of other minor additional elements is permitted (on the other hand, these minor additional elements do not have to exist). Further, the A in this formula denotes one or more types of elements selected from the group consisting of P, Si, S, and V.

In Formula (1), A is particularly preferably P and/or Si.

The present invention also provides a lithium secondary battery (typically a lithium ion battery) including the positive electrode disclosed herein.

The lithium secondary battery disclosed herein is particularly suitable for use as a battery installed in a vehicle that requires high rate charging/discharging. Therefore, the present invention provides a vehicle including the lithium secondary battery disclosed herein. In particular, the present invention provides a vehicle (an automobile, for example) that includes the lithium secondary battery as a power supply (typically, a power supply for a hybrid vehicle or an electric vehicle).

MODES FOR CARRYING OUT THE INVENTION

Figure 1:
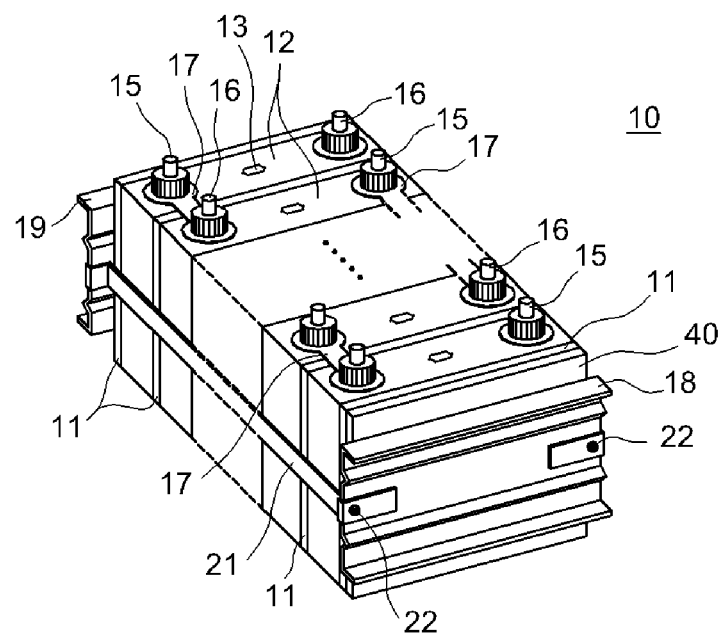
FIG. 1 is a schematic perspective view showing a battery pack according to an embodiment of the present invention.

A preferred embodiment of the present invention will be described below. Note that matter required to implement the present invention other than items noted particularly in the present specification may be understood as design items to be implemented by a person skilled in the art on the basis of the prior art in the corresponding fields. The present invention can be implemented on the basis of the content disclosed in the present specification and technical common knowledge in the corresponding fields.

A positive electrode disclosed herein is a positive electrode for a lithium secondary battery including a positive electrode collector and a positive electrode active material layer formed on the collector. A metal collector made of a similar material to a collector used in a positive electrode of a conventional lithium secondary battery (typically a lithium ion battery) may be used as the positive electrode collector constituting the positive electrode. For example, an aluminum material or an alloy material having aluminum as a main component is suitable as a constitutional material for a positive electrode collector of this type of battery. Aluminum foil having a thickness of approximately 5 μm to 100 μm, for example, may be used favorably as a positive electrode collector of a lithium secondary battery used as a motor driving power supply for a vehicle. A collector made of a metal other than aluminum may of course be used instead.

There are no particular limitations on the composition and shape of a positive electrode active material used to construct the positive electrode active material layer of the positive electrode disclosed herein as long as the positive electrode active material possesses properties enabling realization of the objects of the present invention. A composite oxide containing lithium and at least one type of transition metal element may be cited as a typical positive electrode active material. For example, a cobalt lithium composite oxide ($LiCoO_2$), a nickel lithium composite oxide ($LiNiO_2$), a manganese lithium composite oxide ($LiMn_2O_4$), a so-called binary system lithium-containing composite oxide including two types of transition metal element, such as nickel-cobalt based $LiNi_xCo_{1-x}O_2$ (0<x<1), cobalt-manganese based $LiCo_xMn_{1-x}O_2$ (0<x<1), and nickel-manganese based $LiNi_xMn_{1-x}O_2$ (0<x<1) or $LiNi_xMn_{2-x}O_4$ (0<x<2), or a tertiary system lithium-containing composite oxide including three types of transition metal element, such as a nickel-cobalt-manganese based composite oxide, may be used.

A compound represented by a following general formula:

$$LiMAO_4 \quad (1)$$

may be cited as a particularly favorable positive electrode active material. The M in this formula denotes one or more types of elements (typically one or more types of metallic elements) including at least one type of metallic element selected from the group consisting of Fe, Co, Ni, and Mn. In other words, the compound contains at least one type of metallic element selected from the group consisting of Fe, Co, Ni, and Mn, but the existence of small amounts of other minor additional elements is permitted (on the other hand, these minor additional elements do not have to exist). Further, the A in the above formula denotes one or more types of elements selected from the group consisting of P, Si, S, and V.

This type of polyanionic compound is preferably used in order to avoid or reduce the use of expensive metallic materials having a high theoretical energy density. Compounds in which A represents P and/or Si in Formula (1) above (for example, $LiFePO_4$, $LiFeSiO_4$, $LiCoPO_4$, $LiCoSiO_4$, $LiFe_{0.5}Co_{0.5}PO_4$, $LiFe_{0.5}Co_{0.5}SiO_4$, $LiMnPO_4$, $LiMnSiO_4$, $LiNiPO_4$, or $LiNiSiO_4$) may be cited as particularly preferable polyanionic compounds. In these compounds, oxygen is bound covalently and fixed to the P and Si, i.e. the elements that are not transition metals, and therefore oxygen discharge at high temperatures can be suppressed.

The composite oxide constituting the various types of positive electrode active material described above can be obtained similarly to a conventional composite oxide of a similar type by mixing the constitutional elements of the composite oxide together with several types of supply sources (compounds) selected appropriately in accordance with the atomic compositions of the constitutional elements at a predetermined molar ratio, and then baking the resulting mixture at a predetermined temperature using appropriate means.

For example, a polyanionic compound in which A represents P or Si in Formula (1) above can be obtained by mixing together an appropriate lithium supply source compound, one or more types of transition metal supply source compounds, and phosphoric acid or silicic acid (or an appropriate silicate or phosphate), and then baking and grinding/granulating the mixture.

A lithium compound such as lithium carbide or lithium hydride, for example, may be used as the lithium supply source compound. As a transition metal supply source compound for supplying a transition metal such as nickel or cobalt, a hydride, an oxide, various types of salt (a carbonate, for example), a halide (a fluoride, for example), or the like of the constitutional metal may be selected.

A particulate positive electrode active material having a desired mean particle diameter can be manufactured by subjecting the composite oxide (positive electrode active material) obtained after baking to grinding processing, and if necessary granulation processing, using appropriate means.

According to the present invention, an adhesive strength of the positive electrode active material contained in the positive electrode active material layer can be Unproved. As a result, the particulate positive electrode active material having a small particle diameter can be held on the positive electrode active material layer with great adhesive strength. In other words, according to the present invention, a positive electrode in which the particulate positive electrode active material having a small particle diameter is held with great adhesive strength on the positive electrode active material layer can be provided. By using the particulate positive electrode active material having a small particle diameter, the conductivity of the positive electrode active material layer can be improved, and therefore a positive electrode for a lithium secondary battery which is suitable for high-rate charging/discharging can be provided.

A particulate positive electrode active material in which the mean particle diameter (a 50% median diameter: d50 based on observation using an electron microscopy such as an SEM or a TEM, for example) of the primary particles is 1 μm or less, for example a primary-particle mean particle diameter based on electron microscopy observation of 0.1 μm to 1 μm (more preferably 0.1 μm to 0.8 μm) can be used favorably. Note that the mean particle diameter of secondary particles of the particulate positive electrode active material can be measured easily through electron microscope observation or using a laser analysis type (light scattering method) particle size distribution measurement apparatus.

This type of positive electrode active material having a small mean particle diameter has a large surface area, and therefore the conductivity of the positive electrode active material layer improves. A micro-particulate positive electrode active material (a composite oxide such as the polyanionic compounds described above, for example) in which a specific surface area ($m^2/g$) based on a BET method is 5 $m^2/g$ or more and more preferably 10 $m^2/g$ or more (for example, the specific surface area based on the above method is between 5 $m^2/g$ and 20 $m^2/g$ and more preferably between 10 $m^2/g$ and 20 $m^2/g$) can be used favorably. This type of positive electrode active material (a polyanionic compound such as lithium iron phosphate ($LiFePO_4$) or another composite oxide, for example) having a small mean particle diameter (primary particle diameter) can be formed using a typical hydrothermal synthesis method.

A conductive carbonaceous coating film (typically a carbon film) is formed on the surface of the positive electrode active material used to construct the positive electrode disclosed herein. The carbonaceous coating film can be formed favorably on the surface of a composite oxide such as those described above using a similar method to the prior art.

For example, a desired carbonaceous coating film (typically a carbon film formed from a network constituted only by carbon atoms) can be formed on the surface of the positive electrode active material by coating the surface of the particulate compound constituting the positive electrode active material with a carbonaceous material and then thermally decomposing the coating. Various polymer compounds containing carbon may be used as carbonaceous materials suitable for this purpose. Example of organic compounds include various types of polymer, for example (1) polyolefin resin, polyvinyl acetate, polybutadiene, polyvinyl alcohol, or other types of synthetic resin, and (2) styrene, acetylene, and other types of hydrocarbon. Of these compounds, hydrophilic materials are preferable, and therefore a hydrophilic resin such as polyvinyl alcohol can be used favorably.

A carbonaceous material/positive electrode active material aggregate can be formed by preparing a slurry in which the particulate positive electrode active material and the carbonaceous material are intermixed at a predetermined mass ratio, for example 0.5 parts by weight to 10 parts by weight (typically between 1 part by weight and 5 parts by weight) of the carbonaceous material to 100 parts by weight of the positive electrode active material, and then removing a solvent from the slurry using an appropriate dryer or kiln (for example, an apparatus that performs drying or baking using a cyclone system). Next, the carbonaceous material/positive electrode active material aggregate is heated to a temperature region in which the used carbonaceous material can thermally decompose either in a vacuum (an ultralow pressure gas) or a non-oxidizing (or reducing) atmosphere gas. As a result, the carbonaceous material thermally decomposes, whereby the surface of the positive electrode active material can be covered in carbon component residue (a thermal decomposition product). Although not particularly limited, a mass ratio of the carbonaceous coating film relative to an overall weight of the positive electrode active material particles including the carbonaceous coating film is preferably between approximately 1% by weight and 5% by weight.

Note that a thickness and a film surface area (in other words, a coverage relative to the entire surface of the positive electrode active material particles) of the formed carbonaceous coating film can be adjusted by appropriately varying the mass ratio between the intermixed positive electrode active material and carbonaceous material. An average thickness of the carbonaceous coating film based on observation using an SEM or the like is preferably 1 μm or less (typically between 50 nm and 1000 nm, and particularly preferably between 100 nm and 500 nm). With this film thickness, an improvement in conductivity can be achieved and the binding material can be bound (coupled) to a film surface (carbon atoms) favorably.

Meanwhile, at least one type of binding material used together with the positive electrode active material to construct the positive electrode active material layer of the positive electrode disclosed herein is a binding material constituted by a polymer compound having at least one functional group. There are no particular limitations on the type of functional group as long as it is reactive enough to be able to bind molecularly to the carbonaceous coating film on the surface of the positive electrode active material. However, a functional group that can react (undergo a condensation reaction, for example) with the surface of the carbonaceous coating film (typically the carbon atoms constituting the carbonaceous coating film themselves or a functional group such as a hydroxy group (—OH) introduced into the film) such that the two components are coupled to form a single molecular chain (in other words, a composite compound constituted by a carbon network part and a binding material forming part) is preferable. A hydroxy group and a carboxyl group may be cited as favorable examples of this type of functional group. For example, a polymer compound having a carboxyl group (—COOH) and/or a hydroxy group (—OH) may be used.

A chemical bond is formed between the polymer compound containing these functional groups and the carbon network constituting the carbonaceous coating film in the form of —C—O—C— (or —C—O—O—C—) as a result of a dehydration condensation reaction, and therefore the polymer compound (the binding material) can be bound favorably to any of the carbon atoms constituting the carbonaceous coating film on the surface of the positive electrode active material.

A vinylidene fluoride-based polymer having vinylidene fluoride as a main monomer component, vinylidene fluoride being a monomer component of polyvinylidene fluoride (PVdF), which is a typical polymer compound used conventionally as a binding material in a positive electrode active material layer, and having a functional group introduced therein may be cited as a favorable example. A vinylidene fluoride-based polymer into which a hydroxy group and/or a carboxyl group has been introduced as the functional group is particularly favorable.

This type of polymer containing a functional group can be obtained by copolymerizing vinylidene fluoride with a copolymerizable dibasic acid ester (a monoester, for example). Although not particularly limited, a copolymerizable dibasic acid or an ester thereof (for example, a dibasic acid ester of maleic acid, fumaric acid, succinic acid, itaconic acid, or the like) can be used favorably. For example, a vinylidene fluoride-based polymer having a functional group (a carboxyl group, for example) derived from a dibasic acid ester can be obtained by adding 100 parts by weight of vinylidene fluoride (a monomer) and approximately 0.1 parts by weight to 10 parts by weight of an unsaturated dibasic acid ester such as maleic acid monomethyl ester (or maleic acid monoethyl ester) to ion-exchanged water, performing suspension polymerization typically in a room temperature region (between 20° C. and 35° C., for example) for approximately 12 hours to 72 hours (between 0.5 days and 3 days), performing dehydration processing when the polymerization is complete, and then appropriately rinsing and drying the resulting component. Note that the method of manufacturing a polymer containing a functional group is widely known in the prior art, and therefore detailed description thereof will not be provided here.

Alternatively, instead of manufacturing the target polymer (polymer compound) into which various functional groups have been introduced through the copolymerization process described above, the functional group may be introduced into a molecular chain by implementing appropriate modification processing on a pre-existing polymer (polymer compound).

The positive electrode active material layer (also referred to as a positive electrode mixture layer) is formed on the positive electrode collector using the functional group-containing binding material described above and the positive electrode active material including the carbonaceous coating film described above. However, the method of forming the positive electrode active material layer itself is similar to a conventional method, and no special processing needs to be implemented on the positive electrode active material layer in order to implement the present invention.

Typically, a positive electrode active material layer forming material (in other words, a positive electrode active material layer forming composition) is prepared by dispersing the particulate positive electrode active material including the carbonaceous coating film disclosed herein and the polymer compound containing at least a functional group (for example, the vinylidene fluoride-based polymer having a carboxyl group or a hydroxy group described above) serving as the binding material through an appropriate dispersion medium so that the components are mixed into a paste form (including a slurry form or an ink form; likewise hereafter). This paste form positive electrode active material layer forming composition will also be referred to hereafter as a "positive electrode active material layer forming paste". Note that if necessary, the positive electrode active material layer forming paste may be prepared by adding an appropriate amount of carbon black such as acetylene black or Ketjen black, or another (graphite or the like) powder form carbon material (conductive material).

As described above, in the present invention, the polymer compound (polymer) constituting the binding material is molecularly coupled to the carbon atoms constituting the carbonaceous coating film on the positive electrode active material to form a single molecular chain (in other words, a composite compound constituted by the carbon network part of the carbonaceous coating film and the binding material forming part). Further, the polymer compound (the vinylidene fluoride-based polymer described above, for example) constituting the binding material contained in the positive electrode active material layer preferably forms a network (a network configuration) through intermolecular cross-linking, and therefore a positive electrode active material layer exhibiting great adhesive strength and superior structural stability can be formed using a smaller amount of binding material than in the prior art. Although not particularly limited, the mass ratio of the binding material relative to the overall weight (100% by weight) of the solid positive electrode active material layer may be set at approximately 10% or less by weight (for example, between 1% by weight and 10% by weight and more preferably between 2% by weight and 7% by weight).

A positive electrode for a lithium secondary battery including a positive electrode collector and a positive electrode active material layer formed on the collector can be manufactured by applying an appropriate amount of the prepared positive electrode active material layer forming paste onto the positive electrode collector, which is preferably formed from aluminum or an alloy having aluminum as a main component, and then implementing drying and pressing processing.

To implement the present invention, after forming the positive electrode active material layer in the manner described above, processing is performed to chemically bind the particulate positive electrode active material including the carbonaceous coating film forming the active material layer to the functional group-containing polymer compound.

The content of this processing may be varied in accordance with the type of the functional group, but when the functional group is a carboxyl group or a hydroxy group, the functional group-containing polymer compound (i.e. the binding material) can be molecularly bound favorably to the carbonaceous coating film on the particulate positive electrode active material via the functional group by a condensation reaction (particularly preferably a dehydration condensation reaction).

For example, the positive electrode active material layer is preferably heated (to between 100° C. and 250° C., and more preferably between 150° C. and 200° C., for example) after being reduced in pressure to an appropriate level (substantially to a vacuum condition). By performing this pressure reducing/heating processing, the carbonaceous coating film and the binding material can be bound (coupled) favorably through a dehydration condensation reaction.

To improve a frequency of the chemical bonds between the carbonaceous coating film and the binding material, a type of modification processing may be implemented on the surface of the carbonaceous coating film on the positive electrode active material to introduce a functional group into the carbon network, for example. By implementing surface plasma treatment in the presence of water vapor (water molecules), for example, a hydroxy group can be introduced into the carbon atoms constituting the carbonaceous coating film on the positive electrode active material at a comparatively high rate.

Note that a hydroxy group or another organic functional group may exist in the carbonaceous coating film formed by the processes described above, typically on the surface thereof. For example, a hydroxy group is introduced into the carbonaceous coating film (the carbon network) following a reaction with water vapor in the air. Therefore, a functional group-containing polymer compound can be molecularly bound (coupled) to the carbonaceous coating film on the positive electrode active material by initiating a dehydration condensation reaction or the like without implementing surface modification processing such as the aforementioned surface plasma treatment.

As is evident from the above description, the aforesaid dehydration condensation reaction may occur not only between the carbonaceous coating film of the positive electrode active material and the functional group-containing polymer compound (the binding material), but also, depending on the structure of the molecules constituting the binding material, within the binding material itself. More specifically, mutual bonds (i.e. intermolecular cross-links) may be formed within the binding material, or intramolecular cross-links may be formed in the molecular chain of the polymer compound (polymer) constituting the binding material. Hence, by initiating the condensation reaction described above, the polymer compound constituting the binding material contained in the positive electrode active material layer can be cross-linked. Alternatively, when the molecular chain constituting the binding material includes a multiple bond part such as a double bond, a cleavage-addition reaction occurs in this part, and as a result, intermolecular cross-links are formed within the binding material. As a result of this cross-linking reaction, a network can be formed from the bonds generated in the binding material included in the positive electrode active material layer.

By forming a network (network configuration) from the cross-link bonds in the polymer compound constituting the binding material in this manner, the adhesive strength of the positive electrode active material layer can be improved using a comparatively small amount of the binding material, and therefore an increase in an internal resistance of the battery can be suppressed. Hence, a highly durable lithium secondary battery suitable for high rate charging/discharging can be constructed.

Next, an embodiment in which a lithium secondary battery is constructed using the positive electrode for a lithium secondary battery according to the present invention will be described.

A negative electrode for the lithium secondary battery, which forms a pair with the positive electrode disclosed herein, may be manufactured using a similar method to the prior art. Any material capable of storing and releasing lithium ions, for example a carbon material such as graphite, an oxide material such as lithium/titanium oxide ($Li_4Ti_5O_{12}$), an alloy material constituted by an alloy of tin (Sn), aluminum (Al), zinc (Zn), silicon (Si), and so on, or the like may be used as a negative electrode active material employed in the negative electrode for the lithium secondary battery. In a typical example, a powder form carbon material constituted by graphite or the like is used. Graphite particles have a small particle diameter and a large surface area per unit volume, and are therefore particularly preferable as a negative electrode active material suitable for rapid charging/discharging (high output discharging, for example).

Similarly to the positive electrode, a paste form negative electrode active material layer forming composition (negative electrode active material layer forming paste) can be prepared by dispersing the powder form material through an appropriate dispersion medium together with an appropriate binding material such that the components intermix. The negative electrode for the lithium secondary battery can be manufactured by applying an appropriate amount of the paste to a negative electrode collector preferably constituted by copper, nickel, or an alloy thereof, and implementing drying and pressing processing thereon.

A similar separator to that of the prior art may be employed as a separator used together with the positive electrode and the negative electrode. A porous sheet (a porous film) or the like constituted by polyolefin resin, for example, may be used. Alternatively, a solid polymer electrolyte may be used as the separator.

A similar non-aqueous electrolyte (typically an electrolyte solution) used in a conventional lithium secondary battery may be employed without any particular limitations as an electrolyte. The aforementioned solid polymer electrolyte is typically formed from a supporting electrolyte in an appropriate non-aqueous solvent. As the non-aqueous solvent, one or more types selected from the group consisting of propylene carbonate (PC), ethylene carbonate (EC), diethyl carbonate (DEC), dimethyl carbonate (DMC), ethylmethyl carbonate (EMC), and so on, for example, may be used. Further, as the supporting electrolyte, one or more types of lithium compounds (lithium salts) selected from $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, $LiI$, and so on, for example, may be used.

Moreover, as long as the positive electrode for a lithium secondary battery disclosed herein is employed, there are no particular limitations on the shape (outer shape and size) of the constructed lithium secondary battery. The battery may have a thin sheet type outer casing constituted by a laminate film or the like, and the battery outer casing may take a cylindrical or rectangular parallelepiped shape or a small button shape.

A usage embodiment of the positive electrode for a lithium secondary battery disclosed herein will be described below, taking as an example a lithium secondary battery (here, a lithium ion battery using a non-aqueous electrolyte) including a wound electrode assembly and an in-vehicle battery pack constructed using this battery as a constitutional part (a single cell). However, the present invention is not limited to this embodiment.

Note that in the drawings to be described below, identical reference symbols have been allocated to parts and sites exhibiting identical actions, and duplicate description thereof has been omitted or simplified. Further, dimensional relationships (lengths, widths, thicknesses, and so on) in the drawings do not reflect actual dimensional relationships.

As shown in FIG. 1, a single cell 12 used as a constitutional component of a battery pack 10 according to this embodiment typically includes, similarly to a single cell provided in a conventional battery pack, an electrode assembly including predetermined battery forming materials (positive and negative electrode active materials, positive and negative electrode collectors, a separator, and so on), and a container that houses the electrode assembly and an appropriate electrolyte.

The battery pack 10 disclosed herein includes a predetermined number of (typically 10 or more, preferably between approximately 10 and 30, for example 20) identically shaped single cells 12. The single cell 12 includes a container 14 shaped (having a flattened box shape in this embodiment) to be capable of accommodating a flattened wound electrode assembly, to be described below. Irregularities may occur in the size (an outer shape such as a lamination direction thickness, for example) of each part of the single cell 12 due to dimension errors or the like occurring during manufacture of the employed container 14.

A positive electrode terminal 15 that is electrically connected to a positive electrode of the wound electrode assembly and a negative electrode terminal 16 that is electrically connected to a negative electrode of the electrode assembly are provided on the container 14. As shown in the drawing, the positive electrode terminal 15 of one single cell 12 and the negative electrode terminal 16 of the adjacent single cell 12 thereto are electrically connected to each other by a connector 17. By connecting the respective single cells 12 in series in this manner, the battery pack 10 is constructed with a desired voltage.

Note that a safety valve 13 or the like for allowing gas generated in the interior of the container 14 to escape may be provided in the container 14 similarly to a conventional single cell container. The constitution of the container 14 is not a feature of the present invention, and therefore detailed description thereof has been omitted.

There are no particular limitations on the material of the container 14, and an identical material to that of a conventional single cell may be used. For example, a metal (aluminum, steel, and so on, for example) container, a synthetic resin (a polyolefin resin such as polypropylene or a high-melting point resin such as polyethylene terephthalate, polytetrafluoroethylene, or polyamide resin, for example), or the like can be used favorably. The container 14 according to this embodiment is made of aluminum, for example.

Figure 2:
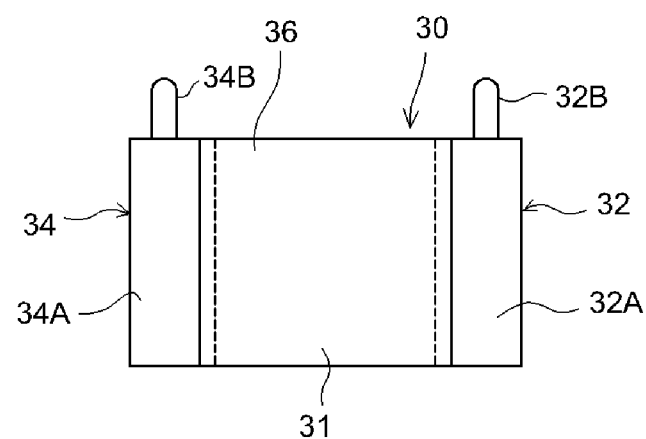
FIG. 2 is a schematic front view showing an example of a wound electrode assembly.
Figure 3:
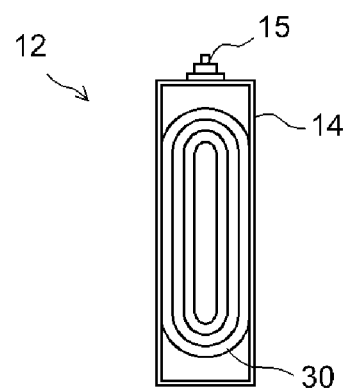
FIG. 3 is a schematic sectional view showing the constitution of a single cell installed in the battery pack.

As shown in FIGS. 2 and 3, the single cell 12 includes the flattened wound electrode assembly 30, which is manufactured similarly to a wound electrode assembly of a normal lithium ion battery by laminating a sheet-like positive electrode 32 (also referred to hereafter as a "positive electrode sheet 32") and a sheet-like negative electrode 34 (also referred to hereafter as a "negative electrode sheet 34") together with a total of two sheet-like separators 36 (also referred to hereafter as "separator sheet 36"), winding the positive electrode sheet 32 and negative electrode sheet 34 while slightly shifting positions thereof, and then crushing the obtained wound assembly from a side face direction such that the wound assembly is flattened.

As shown in FIGS. 2 and 3, when the positive electrode sheet 32 and negative electrode sheet 34 are wound while slightly shifting the positions thereof in a lateral direction relative to a winding direction of the wound electrode assembly 30, as described above, respective ends of the positive electrode sheet 32 and the negative electrode sheet 34 partially project outward from a wound core part 31 (in other words, a part where a positive electrode active material layer forming part of the positive electrode sheet 32, a negative electrode active material layer forming part of the negative electrode sheet 34, and the separator sheet 36 are tightly wound). A positive electrode lead terminal 32B and a negative electrode lead terminal 34B are annexed respectively to a positive electrode side projecting part (i.e. a part in which the positive electrode active material layer is not formed) 32A and a negative electrode side projecting part (i.e. a part in which the negative electrode active material layer is not formed) 34A, and the positive and negative electrode lead terminals 32B, 34B are electrically connected to the positive electrode terminal 15 and the negative electrode terminal 16, respectively.

The materials and members constituting the wound electrode assembly 30 formed as described above are not particularly limited, and apart from the positive electrode (here, the positive electrode sheet 32) in which the positive electrode active material layer disclosed herein is formed on the collector, the materials and members may be similar to those of an electrode assembly for a conventional lithium ion battery.

The positive electrode sheet 32 is formed by applying a positive electrode active material layer for a lithium ion battery onto an elongated positive electrode collector (elongated aluminum foil, for example). The shape of the positive electrode collector may be varied in accordance with the shape of the lithium secondary battery and so on and is therefore not particularly limited. A rod shape, a plate shape, a sheet shape, a foil shape, and various other shapes may be employed.

In this embodiment, a sheet-like positive electrode collector is employed since a collector of this shape can be used favorably in the lithium secondary battery (single cell) 12 including the wound electrode assembly 30. For example, aluminum foil having a length of 2 m to 4 m (2.7 m, for example), a width of 8 cm to 12 cm (10 cm, for example), and a thickness of 5 μm to 20 μm (15 μm, for example) is used as the collector, and the positive electrode active material layer is formed by providing a positive electrode active material layer forming paste prepared in advance as described above on the surface of the collector, for example a positive electrode active material layer forming paste prepared by mixing together 85% by weight to 95% by weight of a particulate positive electrode active material including a conductive carbonaceous coating film (typically a carbon film obtained by thermally decomposing an organic compound), 0% by weight to 5% by weight of a conductive material such as carbon black or acetylene black, and 1% by weight to 10% by weight of a functional group-containing polymer compound (a binding material) in a water-based solvent. Note that the water-based solvent is typically water, but any aqueous solvent may be used, for example an aqueous solution containing lower alcohol (methanol, ethanol, or the like). The surface of the positive electrode collector can be coated favorably with the paste using an appropriate coating apparatus such as a gravure coater, a slit coater, a die coater, or a comma coater.

After applying the paste, the solvent (typically water) contained in the paste is dried and compressed (pressed), whereby the positive electrode active material layer is formed. A known conventional compression method such as a roll pressing method or a flat plate pressing method may be used as a compression method. To adjust a layer thickness of the positive electrode active material layer, the thickness may be measured using a film thickness measuring instrument, and compression may be implemented a plurality of times while adjusting a pressing pressure until a desired thickness is obtained.

The positive electrode collector formed with the positive electrode active material layer on its surface is housed in a pressure reduction chamber, whereupon a condensation reaction (typically a dehydration condensation reaction) is initiated under a vacuum condition (for example, no more than 0.01 MPa (no more than approximately one tenth of atmospheric pressure), and preferably no more than 0.001 MPa (no more than approximately one hundredth of atmospheric pressure)). The dehydration condensation reaction may be performed in a normal temperature region (between 20° C. and 35° C.), but is preferably performed under a higher temperature condition (between 100° C. and 200° C., for example) than the normal temperature region.

By performing the condensation reaction, the binding material is molecularly bound to the surface of the carbonaceous coating film on the positive electrode active material particles, thereby forming a composite compound constituted by the carbon network part of the carbonaceous coating film and the binding material forming part. Furthermore, the molecules constituting the binding material are favorably cross-linked. As a result, the positive electrode sheet 32 is formed with a positive electrode active material layer that exhibits great adhesive strength from a comparatively small amount of the binding material.

The negative electrode sheet 34, meanwhile, can be formed by applying a negative electrode active material layer for a lithium ion battery onto an elongated negative electrode collector. A conductive material constituted by a metal exhibiting favorable conductivity is preferably used as the negative electrode collector. Copper, for example, may be used. The shape of the negative electrode collector may be varied in accordance with the shape of the lithium secondary battery and so on and is therefore not particularly limited. A rod shape, a plate shape, a sheet shape, a foil shape, and various other shapes may be employed. In this embodiment, a sheet-like negative electrode collector is employed since a collector of this shape can be used favorably in the lithium secondary battery (single cell) 12 including the wound electrode assembly 30. For example, the negative electrode active material layer can be manufactured favorably by using copper foil having a length of 2 m to 4 m (2.9 m, for example), a width of 8 cm to 12 cm (10 cm, for example), and a thickness of 5 μm to 20 μm (10 μm, for example) as the negative electrode collector, coating a surface thereof with a negative electrode active material layer forming paste (94% by weight to 98% by weight of graphite, 1% by weight to 3% by weight of SBR, and 1% by weight to 3% by weight of CMC, for example) prepared by adding an appropriate negative electrode active material (typically a carbon material such as graphite), a binding material, and so on to an appropriate solvent (water, an organic solvent, or a mixture thereof) and dispersing or dissolving these components through the solvent, drying the solvent, and then compressing the resulting component. The manufacturing method is similar to that employed on the positive electrode side, and therefore detailed description thereof has been omitted.

Further, porous polyolefin resin, for example, may be used favorably as the separator sheet 36 provided between the positive and negative electrode sheets 32, 34. For example, a porous separator sheet made of synthetic resin (a polyolefin such as polyethylene, for example) having a length of 2 m to 4 m (3.1 m, for example), a width of 8 cm to 12 cm (11 cm, for example), and a thickness of 5 μm to 30 μm (25 μm, for example) may be used favorably.

Note that in a lithium secondary battery (a so-called lithium ion polymer battery) using a solid electrolyte or a gel-form electrolyte as the electrolyte, a separator may not be required (in other words, in this case, the electrolyte itself can function as a separator).

As shown in FIG. 3, the single cell 12 is constructed by accommodating the obtained flattened wound electrode assembly 30 in the container 14 such that a winding axis thereof is horizontal, injecting a non-aqueous electrolyte (an electrolyte solution) such as a mixed solvent of diethyl carbonate and ethylene carbonate (mass ratio 1:1, for example) containing an appropriate amount (concentration 1 M, for example) of an appropriate supporting electrolyte (a lithium salt such as $LiPF_6$, for example) therein, and then sealing the resulting member.

As shown in FIG. 1, a plurality of identically shaped single cells 12 constructed as described above are arranged in a direction for causing wide surfaces of the respective containers 14 (in other words, surfaces corresponding to a flattened surface of the wound electrode assembly 30, to be described below, accommodated in the container 14) to oppose each other while being reversed one by one such that the respective positive electrode terminals 15 and negative electrode terminals 16 thereof are disposed alternately. A cooling plate 11 having a predetermined shape is disposed in close contact with the wide surface of the container 14 between the arranged single cells 12 and on the two outer sides thereof in the single cell arrangement direction (lamination direction). The cooling plate 11 functions as a heat discharging member for efficiently discharging heat generated in each single cell during use, and is preferably formed in a frame shape so that a cooling fluid (typically air) can be introduced between the single cells 12. Alternatively, the cooling plate 11 may be formed from a metal exhibiting favorable thermal conductivity or a lightweight, hard synthetic resin such as polypropylene.

First and second end plates 18, 19 are disposed on respective outer sides of the cooling plates 11 disposed on the two outer sides of the arranged single cells 12 and cooling plates 11 (to be referred to collectively hereafter as a "single cell group"). Further, one or a plurality of sheet-like spacer members 40 serving as length adjusting means may be interposed between the cooling plate 11 and the first end plate 18 disposed on one of the outer sides of the single cell group (a right end in FIG. 2). There are no particular limitations on the constitutional material of the spacer member 40, and as long as a length adjusting function to be described below can be realized, various materials (a metallic material, a resin material, a ceramic material, and so on) may be used. A metallic material or a resin material is preferably used from the view-point of impact tolerance and the like. For example, a spacer member 40 made of lightweight polyolefin resin may be used favorably.

The single cell group in which the single cells 12 are arranged in the lamination direction, the spacer members 40, and the first and second end plates 18, 19 are then bound together in the lamination direction at a predetermined binding pressure P by a fastening binding band 21 attached so as to bridge the first and second end plates 18, 19. More specifically, as shown in FIG. 1, end portions of the binding band 21 are fastened and fixed to the end plate 18 by screws 22 such that the single cell group is bound in the arrangement direction thereof at the predetermined binding pressure P (at which a surface pressure received by a wall surface of the container 14 is approximately 0.1 MPa to 10 MPa, for example). In the battery pack 10 bound at the binding pressure P, the binding pressure also acts on the wound electrode assembly 30 in the interior of the container 14 of each single cell 12, and therefore gas generated in the container 14 can be held in the interior of the wound electrode assembly 30 (between the positive electrode sheet 32 and the negative electrode sheet 34, for example), thereby preventing a reduction in battery performance.

In experiments to be described below, a lithium secondary battery (a sample battery) was constructed using the positive electrode including the positive electrode active material layer disclosed herein, and the performance thereof was evaluated.

Experiment 1

Manufacture of Positive Electrode Active Material

Lithium hydroxide ($LiOH \cdot H_2O$), iron sulfate ($FeSO_4 \cdot 7H_2O$), and inorganic phosphate ($H_3PO_4$) were used respectively as a lithium supply source, an iron supply source, and a phosphor supply source. More specifically, these supply source compounds were added to deionized water and mixed together such that an Li:Fe:P molar ratio of 3:1:1 was obtained.

The mixed solvent was placed into an autoclave and hydrothermally synthesized for approximately 12 hours in a high temperature region of 170° C. to 180° C. Upon completion of the reaction, the mixture was cooled to room temperature, whereupon the resulting reaction product, i.e. lithium iron phosphate ($LiFePO_4$), was recovered. Next, the obtained compound was crushed in a ball mill until a particulate positive electrode active material (lithium iron phosphate) having primary particles with a mean particle diameter of approximately 0.7 μm based on observation under an electron microscopy was obtained.

A carbonaceous coating film was then formed on the surface of the particulate positive electrode active material using polyvinyl alcohol as a carbonaceous material. More specifically, polyvinyl alcohol was added to a predetermined amount of the particulate positive electrode active material ($LiFePO_4$) in an amount corresponding to 5% by weight of the positive electrode active material, whereupon a slurry was prepared by dispersing this mixture through deionized water.

The obtained slurry was placed into a commercially available cyclone type dryer (furnace) to remove the solvent (here, water), whereby an aggregate of the polyvinyl alcohol and the positive electrode active material having a mean particle diameter (secondary particles) of approximately 20 μm was formed. Next, thermal decomposition processing was performed for approximately 1.5 hours at 800° C. in a hydrogen gas atmosphere, whereby the polyvinyl alcohol was reduced and carbonized. The crushing processing was then performed again in the ball mill to manufacture positive electrode active material particles having primary particles with a mean particle diameter of approximately 0.7 μm based on observation under an electron microscopy and formed with a carbonaceous coating film made of a polyvinyl alcohol thermal decomposition product on a surface thereof. A coating amount of the carbonaceous coating film, calculated from the composition, was between 2% by weight and 3% by weight of all of the positive electrode active material particles including the carbonaceous coating film.

Experiment 2

Manufacture of Functional Group-Containing Polymer (Binding Material)

A vinylidene fluoride-based polymer containing a functional group was manufactured through suspension polymerization. More specifically, approximately 400 g of vinylidene fluoride polymer and approximately 4 g of maleic acid monomethyl ester were added to approximately 1000 ml of ion-exchanged water. Further, approximately 4 g of diisopropyl peroxy dicarbonate, approximately 3 g of ethyl acetate, and approximately 1 g of methyl cellulose were added as a polymerization initiator, a chain transfer agent, and a suspending agent, respectively, whereupon suspension polymerization was performed for 48 hours at 28° C. A slurry obtained upon completion of the polymerization was dehydrated, rinsed, and then dried for 20 hours at approximately 80° C.

A carboxyl group content of the polymer (referred to hereafter as "denatured polyvinylidene fluoride" for convenience) obtained in this manner was approximately $1 \times 10^{-4}$ mol/g. This denatured polyvinylidene fluoride was used as the binding material according to this experiment. A weight average molecular weight of the obtained denatured polyvinylidene fluoride, measured using gel permeation chromatography (GPC), was approximately one million.

Experiment 3

Manufacture of Positive Electrode

A positive electrode for a lithium secondary battery was manufactured using the positive electrode active material obtained in Experiment 1 and the binding material obtained in Experiment 2.

More specifically, 90 parts by weight of the positive electrode active material including the carbonaceous coating film, 7 parts by weight of the binding material (denatured polyvinylidene fluoride), and 3 parts by weight of a conductive material (acetylene black) were added to NMP (N-methyl-2-pyrrolidone) serving as a dispersion solvent such that a solid content thereof was 60% by weight. Granulation and mixing were then performed using a bead mill, whereby a positive electrode active material layer forming paste was prepared.

Next, both surfaces of aluminum foil (thickness 15 μm) serving as a positive electrode collector were coated with the positive electrode active material layer forming paste such that a coating amount of the positive electrode active material per unit surface area was 40 mg/cm² to 50 mg/cm², whereupon the resulting component was dried. After being dried, the component was stretched into a sheet-like having a thickness of approximately 120 μm using a roll pressing machine. Then a slit was formed such that the positive electrode active material layer had a predetermined width, whereby a positive electrode sheet was manufactured.

Figure 4:
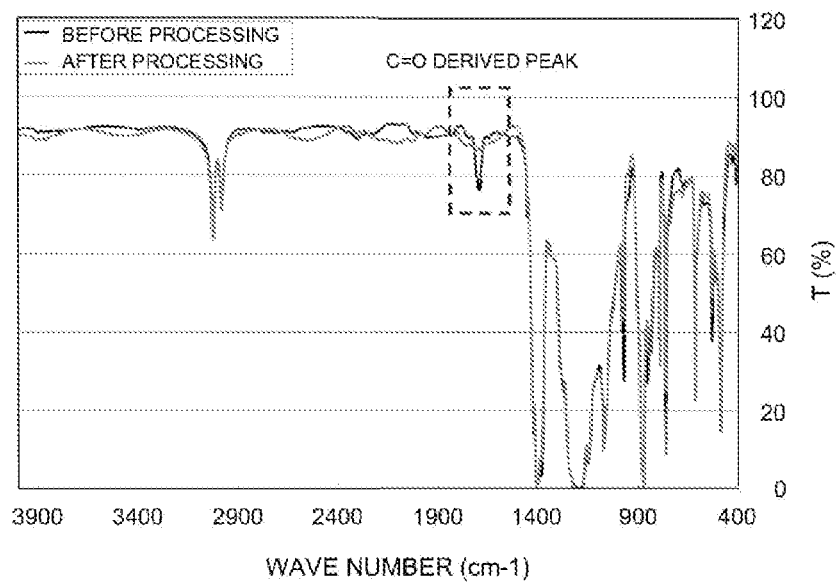
FIG. 4 is a chart showing an IR spectrum of a binding material (denatured polyvinylidene fluoride) contained in a positive electrode active material layer manufactured in an experiment, before and after dehydration condensation processing.

The obtained positive electrode sheet was housed in a vacuum furnace, whereupon the furnace interior was reduced in pressure to a vacuum condition (in other words, an ambient pressure was reduced close to or below 0.001 MPa) and heated to 180° C. to 200° C. Condensation reaction processing was then performed for approximately 12 hours. As a result, the functional group (here, a carboxyl group) of the binding material existing in the positive electrode active material layer was molecularly bound to the carbonaceous coating film (i.e. the carbon atoms constituting the film) of the positive electrode active material. At the same time, cross-link bonds were formed in the binding material (denatured polyvinylidene fluoride) existing within the positive electrode active material layer. A chart in FIG. 4 shows an IR spectrum illustrating this point.

Figure 5:
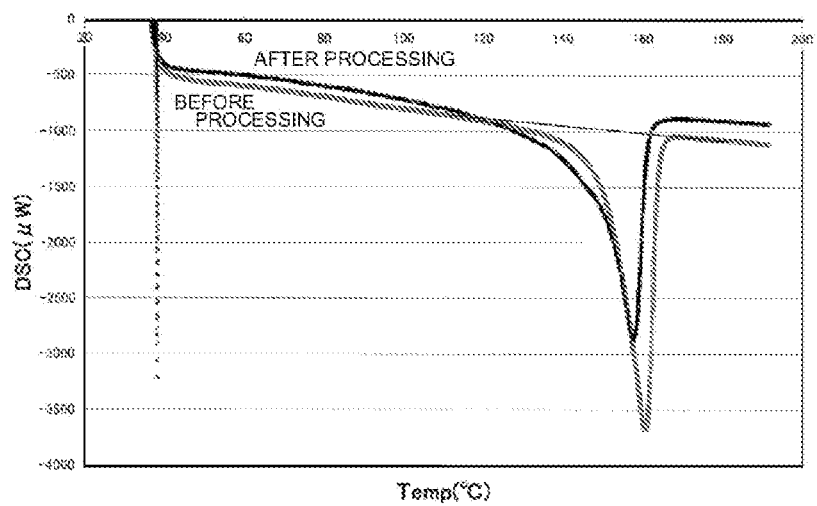
FIG. 5 is a chart showing DSC (Differential Scanning calorimetry) results obtained in relation to the binding material (denatured polyvinylidene fluoride) contained in the positive electrode active material layer manufactured in an experiment, before and after the dehydration condensation processing.

It can be seen that a peak in the vicinity of 1700 cm$^{-1}$ indicating absorption based on stretching vibration of a carbonyl group (C=O), which was evident prior to the condensation reaction processing, disappears in dramatic fashion after the dehydration condensation reaction processing (see a part surrounded by dotted lines on the chart). This shows that the carboxyl group (including C=O) contained in the binding material contributes to chemical bonding with the carbonaceous coating film of the positive electrode active material and intermolecular cross-linking (or intramolecular cross-linking) within the binding material (denatured polyvinylidene fluoride). Further, as shown in FIG. 5, it was confirmed from results of Differential Scanning Calorimetry (DSC) performed respectively on the positive electrode active material layer following the dehydration condensation reaction processing and the positive electrode active material layer prior to the dehydration condensation reaction processing that in the positive electrode active material layer following the dehydration condensation reaction processing, a cross-linking reaction of the existing binding material is further advanced relative to the positive electrode active material layer prior to the dehydration condensation reaction processing. As shown in the drawing, in a comparison of endothermic peaks, a broader peak is observed in the material following the dehydration condensation reaction processing than in the material prior to the processing. This indicates a reduction in orderliness (in other words, an increase in entropy change) accompanying the cross-linking. A reduction in an endothermic peak temperature (Tm) is also observed. Here, Tm is Tm=ΔH (enthalpy change)/ΔS (entropy change).

The positive electrode sheet manufactured by performing the condensation reaction processing described above will be referred to hereafter as the "positive electrode sheet according to the example".

Further, for comparison, another positive electrode sheet was manufactured using similar materials and processes to those of the positive electrode sheet according to the example, except that the dehydration condensation reaction processing was not performed. The positive electrode sheet manufactured for comparison will be referred to hereafter as the "positive electrode sheet according to the comparative example". More specifically, the positive electrode sheet according to the comparative example was not subjected to the dehydration condensation reaction processing described above, and is therefore a positive electrode sheet including a positive electrode active material layer in which substantially no bonds (i.e. bonds generated by the condensation reaction) are formed between the carbonaceous coating film of the positive electrode active material and the binding material and substantially no intermolecular cross-links are formed within the binding material (denatured polyvinylidene fluoride).

Experiment 4

Manufacture of Lithium Secondary Battery

Next, a lithium secondary battery was manufactured using the positive electrode sheet according to the example, obtained as described above. Note that a negative electrode sheet forming a pair therewith was manufactured as follows.

A negative electrode active material layer forming paste was prepared by adding 95 parts by weight of graphite as a negative electrode active material, 2.5 parts by weight of a styrene-butadiene block copolymer (SBR) as a binding material, and 2.5 parts by weight of carboxymethyl cellulose (CMC) as a thickening material to ion-exchanged water and mixing the components together. The negative electrode active material layer forming paste was then applied to both surfaces of copper foil (thickness 10 μm) serving as a negative electrode collector such that the coating amount of the negative electrode active material per unit surface area was 20 mg/cm$^2$ to 25 mg/cm$^2$, whereupon the resulting component was dried. After being dried, the component was stretched into a sheet form having a thickness of approximately 80 μm using a roll pressing machine. The sheet was then slit such that the negative electrode active material layer had a predetermined width, whereby a negative electrode sheet was manufactured. Note that respective coating amounts (volumes) of the positive and negative active material layers were defined such that respective theoretical capacities of the used positive and negative electrodes were 1 (positive electrode): 1.5 (negative electrode).

A lithium secondary battery (lithium ion battery) such as that shown in FIGS. 2 and 3 was constructed using the positive electrode sheet according to the example or the positive electrode sheet according to the comparative example and the negative electrode sheet, prepared as described above. More specifically, the wound electrode assembly was manufactured by laminating the positive electrode sheet and the negative electrode sheet together with two separators and winding the resulting laminated sheet. The electrode assembly was then pressed into a flattened shape and housed in an angular container having an internal volume of 100 mL together with an electrolyte. An opening portion of the container was then sealed, whereby a battery having a sealed structure according to this experiment was constructed. Note that a porous film constituted by a polypropylene/polyethylene complex was used as the separator. Further, a non-aqueous electrolyte solution formed by dissolving 1 mol/L of LiPF$_6$ into a mixed solvent containing propylene carbonate (PC) and diethyl carbonate (DEC) in a volume ratio of 1:1 was used as the electrolyte.

Hereafter, a lithium secondary battery constructed using the positive electrode sheet according to the example will be referred to as the "lithium secondary battery according to the example", while a lithium secondary battery constructed using the positive electrode sheet according to the comparative example will be referred to as the "lithium secondary battery according to the comparative example".

Experiment 5

Performance Evaluation Test of Lithium Secondary Battery

A performance evaluation was performed on the two types of lithium secondary batteries (according to the example and the comparative example) constructed in Experiment 4.

First, a charging amount was set at a constant current-constant voltage system, whereupon charging was performed to a charging upper limit voltage (4.2 V) at room temperature (approximately 25° C.) and at a current value (0.2 C) one fifth of a battery capacity (Ah) predicted from the positive electrode theoretical capacity. Charging was then performed to a point at which a final current value during constant voltage charging reached one tenth of an initial charging current value. Hereafter, this condition will be referred to as a fully charged condition. The fully charged battery was then discharged to 3 V at a current value (0.2 C) one fifth of the battery capacity (Ah) predicted from the positive electrode theoretical capacity. Note that here, 0.2 C is a current value at which the theoretical capacity can be discharged in 1/0.2 hours (i.e. five hours).

On the basis of this charging/discharging test, a discharge capacity per unit weight (mAh/g) of the positive electrode material (positive electrode mixture) constituting the positive electrode active material layer was calculated. The results are shown in corresponding locations of Table 1.

Further, an output (W) obtained after 10 seconds of discharge from the fully charged condition was determined in order to calculate an output density relative to an external volume of the container (W/L). The results are shown in corresponding locations of Table 1.

Furthermore, respective cycle characteristics of the lithium secondary battery according to the example and the lithium secondary battery according to the comparative example were investigated in the following manner.

First, constant current charging at 3 C (a current value at which the theoretical capacity can be discharged in ⅓ of an hour) was performed to 4.2 V under a temperature condition of 60° C. Next, constant voltage charging was performed for approximately 2 hours at 4.2 V. Finally, constant current discharging was performed at 3 C to a final voltage 3 V. This charging/discharging operation was then performed repeatedly in order to determine a capacity retention (%) from a ratio between the discharge capacity of a first cycle and the discharge capacity of a one thousandth cycle. In other words, capacity retention (%)=(discharge capacity of one thousandth cycle/discharge capacity of first cycle)×100.

The obtained results are shown on Table 1.

TABLE 1

|  | DISCHARGE CAPACITY (mAh/g) | OUTPUT DENSITY (W/L) | CAPACITY RETENTION (%) |
|---|---|---|---|
| EXAMPLE | 150 | 3600 | 84 |
| COMPARATIVE EXAMPLE | 147 | 3200 | 78 |

As is evident from the results shown on Table 1, the lithium secondary battery according to Example exhibits more favorable results than the lithium secondary battery according to the comparative example with respect to all of the discharge capacity, the output density, and the capacity maintenance rate. In particular, it was found that due to the improvement in the adhesive strength of the positive electrode active material layer in the lithium secondary battery according to the example, improvements were achieved in the output density and the capacity maintenance rate (in other words, the durability) during high rate charging/discharging.

A preferred embodiment of the present invention was described above, but the above description is not limiting matter and may of course be subjected to various amendments.

Figure 6:
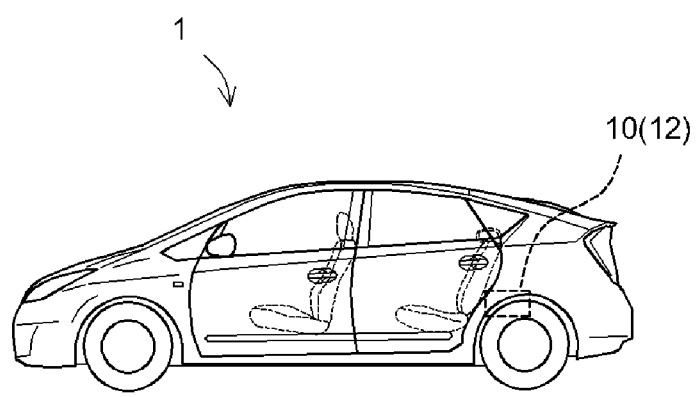
FIG. 6 is a schematic side view showing a vehicle including a lithium secondary battery.

The lithium secondary battery 12 and the battery pack 10 disclosed herein exhibit a superior performance, and a particularly superior high rate charging/discharging characteristic, when applied as a battery installed in a vehicle. Therefore, as shown in FIG. 6, the present invention provides a vehicle 1 including the lithium secondary battery 12 (the battery pack 10) disclosed herein. More particularly, the present invention provides a vehicle (an automobile, for example) that includes the lithium secondary battery 12 as a power supply (typically, a power supply for a hybrid vehicle or an electric vehicle).

INDUSTRIAL APPLICABILITY

According to the present invention, a positive electrode for a lithium secondary battery including a positive electrode active material layer in which an adhesive strength of a positive electrode active material is high can be provided. Hence, when this positive electrode is used, a lithium secondary battery having a superior cycle characteristic and high durability can be provided. More particularly, a lithium secondary battery (for example, an in-vehicle lithium secondary battery used as a power supply for driving a vehicle) that exhibits a superior high rate charging/discharging performance over a long period of time can be provided.

The invention claimed is:

1. A method of manufacturing a positive electrode for a lithium secondary battery having a positive electrode collector and a positive electrode active material layer formed on the collector, comprising:
   preparing a positive electrode active material layer forming composition including a positive electrode active material that is constituted by a composite oxide containing lithium and at least one type of transition metal element and contains a
   a carbon component residue, to which a carbonaceous material is thermally decomposed, on a surface thereof, and at least one type of binding material constituted by an organic polymer compound containing a hydroxy group and/or a carboxyl group, and a solvent capable of dissolving or dispersing the binding material;
   forming the positive electrode active material layer on the positive electrode collector by providing the composition on a surface of the positive electrode collector and then implementing drying and pressing processing; and
   initiating a condensation reaction between the binding material contained in the formed positive electrode active material layer and the carbon component residue on the positive electrode active material such that the organic polymer compound constituting the binding material is molecularly bound to carbon atoms constituting the carbon component residue of at least a part of the positive electrode active material,
   wherein the composite oxide constituting the positive electrode active material is a compound represented by a general formula:

$$LiMAO_4 \qquad (1)$$

where M denotes one or more types of elements including at least one type of metallic element selected from the group consisting of Fe, Co, Ni, and Mn, and A denotes one or more types of elements selected from the group consisting of P, Si, S, and V,
   wherein the condensation reaction is initiated on a condition that the positive electrode active material layer is heated to between 150° C. and 200° C. after being reduced in pressure below 0.001 MPa.

2. The method according to claim 1, wherein at least one type of the used organic polymer compound is a vinylidene fluoride-based polymer having vinylidene fluoride as a main monomer component and a hydroxy group and/or a carboxyl group introduced therein.

3. The method according to claim 1, further comprising cross-linking the organic polymer compound constituting the binding material contained in the positive electrode active material layer.

4. The method according to claim 1, wherein the positive electrode active material is constituted by the composite oxide, which takes a particulate form having primary particles with a mean particle diameter based on measurement using an electron microscopy of 1 μm or less.

* * * * *